US012311446B2

(12) United States Patent
Czinger et al.

(10) Patent No.: US 12,311,446 B2
(45) Date of Patent: *May 27, 2025

(54) ASSEMBLING STRUCTURES COMPRISING 3D PRINTED COMPONENTS AND STANDARDIZED COMPONENTS UTILIZING ADHESIVE CIRCUITS

(71) Applicant: Divergent Technologies, Inc., Los Angeles, CA (US)

(72) Inventors: Kevin Robert Czinger, Santa Monica, CA (US); Antonio Bernerd Martinez, El Segundo, CA (US); Broc William Tenhouten, Rancho Palos Verdes, CA (US); Chukwubuikem Marcel Okoli, Los Angeles, CA (US); Eli Rogers, San Pedro, CA (US)

(73) Assignee: DIVERGENT TECHNOLOGIES, INC., Los Angeles, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/992,653

(22) Filed: Nov. 22, 2022

(65) Prior Publication Data
US 2023/0080324 A1    Mar. 16, 2023

Related U.S. Application Data

(63) Continuation of application No. 15/855,800, filed on Dec. 27, 2017, now Pat. No. 11,534,828.

(51) Int. Cl.
*B33Y 80/00* (2015.01)
*B22F 5/10* (2006.01)
(Continued)

(52) U.S. Cl.
CPC ............. *B22F 5/10* (2013.01); *B22F 7/062* (2013.01); *B22F 10/20* (2021.01); *B33Y 10/00* (2014.12);
(Continued)

(58) Field of Classification Search
CPC .... B33Y 80/00; B62D 27/023; B62D 27/026; B62D 65/02
See application file for complete search history.

(56) References Cited

U.S. PATENT DOCUMENTS 5,203,226 A    4/1993 Hongou et al.
5,742,385 A    4/1998 Champa
(Continued)

FOREIGN PATENT DOCUMENTS

WO    1996036455 A1    11/1996
WO    1996036525 A1    11/1996
(Continued)

OTHER PUBLICATIONS

US 9,809,265 B2, 11/2017, Kinjo (withdrawn)

Primary Examiner — Joanna Pleszczynska
(74) Attorney, Agent, or Firm — ArentFox Schiff, LLP

(57) ABSTRACT

One aspect is an apparatus including a plurality of additively manufactured components each having an adhesive injection channel. The components are connected together such that adhesive injection channels are aligned to form an adhesive path that allows adhesive flow between the components. Another aspect is an apparatus, including an additively manufactured component having an adhesive injection channel and an adhesive flow mechanism comprising at least one of an adhesive side end effector or a vacuum side end effector, the adhesive flow mechanism configured to provide adhesive to the adhesive injection channels.

26 Claims, 11 Drawing Sheets

(51) Int. Cl.
  *B22F 7/06* (2006.01)
  *B22F 10/20* (2021.01)
  *B33Y 10/00* (2015.01)
  *B62D 27/02* (2006.01)
  *B62D 65/02* (2006.01)
  *C09J 5/00* (2006.01)
  *B22F 10/28* (2021.01)
  *B22F 12/49* (2021.01)

(52) U.S. Cl.
  CPC ............ *B33Y 80/00* (2014.12); *B62D 27/023* (2013.01); *B62D 27/026* (2013.01); *B62D 65/02* (2013.01); *C09J 5/00* (2013.01); *B22F 10/28* (2021.01); *B22F 12/49* (2021.01); *B60Y 2410/12* (2013.01)

(56) References Cited

U.S. PATENT DOCUMENTS

| | | | |
|---|---|---|---|
| 5,990,444 A | 11/1999 | Costin | |
| 6,010,155 A | 1/2000 | Rinehart | |
| 6,096,249 A | 8/2000 | Yamaguchi | |
| 6,140,602 A | 10/2000 | Costin | |
| 6,250,533 B1 | 6/2001 | Otterbein et al. | |
| 6,252,196 B1 | 6/2001 | Costin et al. | |
| 6,318,642 B1 | 11/2001 | Goenka et al. | |
| 6,365,057 B1 | 4/2002 | Whitehurst et al. | |
| 6,391,251 B1 | 5/2002 | Keicher et al. | |
| 6,409,930 B1 | 6/2002 | Whitehurst et al. | |
| 6,468,439 B1 | 10/2002 | Whitehurst et al. | |
| 6,554,345 B2 | 4/2003 | Jonsson | |
| 6,585,151 B1 | 7/2003 | Ghosh | |
| 6,644,721 B1 | 11/2003 | Miskech et al. | |
| 6,811,744 B2 | 11/2004 | Keicher et al. | |
| 6,866,497 B2 | 3/2005 | Saiki | |
| 6,919,035 B1 | 7/2005 | Clough | |
| 6,926,970 B2 | 8/2005 | James et al. | |
| 7,152,292 B2 | 12/2006 | Hohmann et al. | |
| 7,344,186 B1 | 3/2008 | Hausler et al. | |
| 7,500,373 B2 | 3/2009 | Quell | |
| 7,586,062 B2 | 9/2009 | Heberer | |
| 7,637,134 B2 | 12/2009 | Burzlaff et al. | |
| 7,710,347 B2 | 5/2010 | Gentilman et al. | |
| 7,716,802 B2 | 5/2010 | Stern et al. | |
| 7,745,293 B2 | 6/2010 | Yamazaki et al. | |
| 7,766,123 B2 | 8/2010 | Sakurai et al. | |
| 7,852,388 B2 | 12/2010 | Shimizu et al. | |
| 7,908,922 B2 | 3/2011 | Zarabadi et al. | |
| 7,951,324 B2 | 5/2011 | Naruse et al. | |
| 8,094,036 B2 | 1/2012 | Heberer | |
| 8,163,077 B2 | 4/2012 | Eron et al. | |
| 8,286,236 B2 | 10/2012 | Jung et al. | |
| 8,289,352 B2 | 10/2012 | Vartanian et al. | |
| 8,297,096 B2 | 10/2012 | Mizumura et al. | |
| 8,354,170 B1 | 1/2013 | Henry et al. | |
| 8,383,028 B2 | 2/2013 | Lyons | |
| 8,408,036 B2 | 4/2013 | Reith et al. | |
| 8,429,754 B2 | 4/2013 | Jung et al. | |
| 8,437,513 B1 | 5/2013 | Derakhshani et al. | |
| 8,444,903 B2 | 5/2013 | Lyons et al. | |
| 8,452,073 B2 | 5/2013 | Taminger et al. | |
| 8,599,301 B2 | 12/2013 | Dowski, Jr. et al. | |
| 8,606,540 B2 | 12/2013 | Haisty et al. | |
| 8,610,761 B2 | 12/2013 | Haisty et al. | |
| 8,631,996 B2 | 1/2014 | Quell et al. | |
| 8,675,925 B2 | 3/2014 | Derakhshani et al. | |
| 8,678,060 B2 | 3/2014 | Dietz et al. | |
| 8,686,314 B2 | 4/2014 | Schneegans et al. | |
| 8,686,997 B2 | 4/2014 | Radet et al. | |
| 8,694,284 B2 | 4/2014 | Berard | |
| 8,720,876 B2 | 5/2014 | Reith et al. | |
| 8,752,166 B2 | 6/2014 | Jung et al. | |
| 8,755,923 B2 | 6/2014 | Farahani et al. | |
| 8,787,628 B1 | 7/2014 | Derakhshani et al. | |
| 8,818,771 B2 | 8/2014 | Gielis et al. | |
| 8,873,238 B2 | 10/2014 | Wilkins | |
| 8,978,535 B2 | 3/2015 | Ortiz et al. | |
| 9,006,605 B2 | 4/2015 | Schneegans et al. | |
| 9,071,436 B2 | 6/2015 | Jung et al. | |
| 9,101,979 B2 | 8/2015 | Hofmann et al. | |
| 9,104,921 B2 | 8/2015 | Derakhshani et al. | |
| 9,126,365 B1 | 9/2015 | Mark et al. | |
| 9,128,476 B2 | 9/2015 | Jung et al. | |
| 9,138,924 B2 | 9/2015 | Yen | |
| 9,149,988 B2 | 10/2015 | Mark et al. | |
| 9,156,205 B2 | 10/2015 | Mark et al. | |
| 9,186,848 B2 | 11/2015 | Mark et al. | |
| 9,244,986 B2 | 1/2016 | Karmarkar | |
| 9,248,611 B2 | 2/2016 | Divine et al. | |
| 9,254,535 B2 | 2/2016 | Buller et al. | |
| 9,266,566 B2 | 2/2016 | Kim | |
| 9,269,022 B2 | 2/2016 | Rhoads et al. | |
| 9,327,452 B2 | 5/2016 | Mark et al. | |
| 9,329,020 B1 | 5/2016 | Napoletano | |
| 9,332,251 B2 | 5/2016 | Haisty et al. | |
| 9,346,127 B2 | 5/2016 | Buller et al. | |
| 9,389,315 B2 | 7/2016 | Bruder et al. | |
| 9,399,256 B2 | 7/2016 | Buller et al. | |
| 9,403,235 B2 | 8/2016 | Buller et al. | |
| 9,418,193 B2 | 8/2016 | Dowski, Jr. et al. | |
| 9,457,514 B2 | 10/2016 | Schwärzler | |
| 9,469,057 B2 | 10/2016 | Johnson et al. | |
| 9,478,063 B2 | 10/2016 | Rhoads et al. | |
| 9,481,402 B1 | 11/2016 | Muto et al. | |
| 9,486,878 B2 | 11/2016 | Buller et al. | |
| 9,486,960 B2 | 11/2016 | Paschkewitz et al. | |
| 9,502,993 B2 | 11/2016 | Deng | |
| 9,525,262 B2 | 12/2016 | Stuart et al. | |
| 9,533,526 B1 | 1/2017 | Nevins | |
| 9,555,315 B2 | 1/2017 | Aders | |
| 9,555,580 B1 | 1/2017 | Dykstra et al. | |
| 9,557,856 B2 | 1/2017 | Send et al. | |
| 9,566,742 B2 | 2/2017 | Keating et al. | |
| 9,566,758 B2 | 2/2017 | Cheung et al. | |
| 9,573,193 B2 | 2/2017 | Buller et al. | |
| 9,573,225 B2 | 2/2017 | Buller et al. | |
| 9,586,290 B2 | 3/2017 | Buller et al. | |
| 9,595,795 B2 | 3/2017 | Lane et al. | |
| 9,597,843 B2 | 3/2017 | Stauffer et al. | |
| 9,600,929 B1 | 3/2017 | Young et al. | |
| 9,609,755 B2 | 3/2017 | Coull et al. | |
| 9,610,737 B2 | 4/2017 | Johnson et al. | |
| 9,611,667 B2 | 4/2017 | GangaRao et al. | |
| 9,616,623 B2 | 4/2017 | Johnson et al. | |
| 9,626,487 B2 | 4/2017 | Jung et al. | |
| 9,626,489 B2 | 4/2017 | Nilsson | |
| 9,643,361 B2 | 5/2017 | Liu | |
| 9,662,840 B1 | 5/2017 | Buller et al. | |
| 9,665,182 B2 | 5/2017 | Send et al. | |
| 9,672,389 B1 | 6/2017 | Mosterman et al. | |
| 9,672,550 B2 | 6/2017 | Apsley et al. | |
| 9,676,145 B2 | 6/2017 | Buller et al. | |
| 9,684,919 B2 | 6/2017 | Apsley et al. | |
| 9,688,032 B2 | 6/2017 | Kia et al. | |
| 9,690,286 B2 | 6/2017 | Hovsepian et al. | |
| 9,700,966 B2 | 7/2017 | Kraft et al. | |
| 9,703,896 B2 | 7/2017 | Zhang et al. | |
| 9,713,903 B2 | 7/2017 | Paschkewitz et al. | |
| 9,718,302 B2 | 8/2017 | Young et al. | |
| 9,718,434 B2 | 8/2017 | Hector, Jr. et al. | |
| 9,724,877 B2 | 8/2017 | Flitsch et al. | |
| 9,724,881 B2 | 8/2017 | Johnson et al. | |
| 9,725,178 B2 | 8/2017 | Wang | |
| 9,731,730 B2 | 8/2017 | Stiles | |
| 9,731,773 B2 | 8/2017 | Gami et al. | |
| 9,741,954 B2 | 8/2017 | Bruder et al. | |
| 9,747,352 B2 | 8/2017 | Karmarkar | |
| 9,764,415 B2 | 9/2017 | Seufzer et al. | |
| 9,764,520 B2 | 9/2017 | Johnson et al. | |
| 9,765,226 B2 | 9/2017 | Dain | |
| 9,770,760 B2 | 9/2017 | Liu | |
| 9,773,393 B2 | 9/2017 | Velez | |
| 9,776,234 B2 | 10/2017 | Schaafhausen et al. | |
| 9,782,936 B2 | 10/2017 | Glunz et al. | |

(56) References Cited

U.S. PATENT DOCUMENTS

| | | |
|---|---|---|
| 9,783,324 B2 | 10/2017 | Embler et al. |
| 9,783,977 B2 | 10/2017 | Alqasimi et al. |
| 9,789,548 B2 | 10/2017 | Golshany et al. |
| 9,789,922 B2 | 10/2017 | Dosenbach et al. |
| 9,796,137 B2 | 10/2017 | Zhang et al. |
| 9,802,108 B2 | 10/2017 | Aders |
| 9,809,977 B2 | 11/2017 | Carney et al. |
| 9,817,922 B2 | 11/2017 | Glunz et al. |
| 9,818,071 B2 | 11/2017 | Jung et al. |
| 9,821,339 B2 | 11/2017 | Paschkewitz et al. |
| 9,821,411 B2 | 11/2017 | Buller et al. |
| 9,823,143 B2 | 11/2017 | Twelves, Jr. et al. |
| 9,829,564 B2 | 11/2017 | Bruder et al. |
| 9,846,933 B2 | 12/2017 | Yuksel |
| 9,854,828 B2 | 1/2018 | Langeland |
| 9,858,604 B2 | 1/2018 | Apsley et al. |
| 9,862,833 B2 | 1/2018 | Hasegawa et al. |
| 9,862,834 B2 | 1/2018 | Hasegawa et al. |
| 9,863,885 B2 | 1/2018 | Zaretski et al. |
| 9,870,629 B2 | 1/2018 | Cardno et al. |
| 9,879,981 B1 | 1/2018 | Dehghan Niri et al. |
| 9,884,663 B2 | 2/2018 | Czinger et al. |
| 9,898,776 B2 | 2/2018 | Apsley et al. |
| 9,914,150 B2 | 3/2018 | Pettersson et al. |
| 9,919,360 B2 | 3/2018 | Buller et al. |
| 9,931,697 B2 | 4/2018 | Levin et al. |
| 9,933,031 B2 | 4/2018 | Bracamonte et al. |
| 9,933,092 B2 | 4/2018 | Sindelar |
| 9,957,031 B2 | 5/2018 | Golshany et al. |
| 9,958,535 B2 | 5/2018 | Send et al. |
| 9,962,767 B2 | 5/2018 | Buller et al. |
| 9,963,978 B2 | 5/2018 | Johnson et al. |
| 9,971,920 B2 | 5/2018 | Derakhshani et al. |
| 9,976,063 B2 | 5/2018 | Childers et al. |
| 9,987,792 B2 | 6/2018 | Flitsch et al. |
| 9,988,136 B2 | 6/2018 | Tiryaki et al. |
| 9,989,623 B2 | 6/2018 | Send et al. |
| 9,990,565 B2 | 6/2018 | Rhoads et al. |
| 9,994,339 B2 | 6/2018 | Colson et al. |
| 9,996,890 B1 | 6/2018 | Cinnamon et al. |
| 9,996,945 B1 | 6/2018 | Holzer et al. |
| 10,002,215 B2 | 6/2018 | Dowski et al. |
| 10,006,156 B2 | 6/2018 | Kirkpatrick |
| 10,011,089 B2 | 7/2018 | Lyons et al. |
| 10,011,685 B2 | 7/2018 | Childers et al. |
| 10,012,532 B2 | 7/2018 | Send et al. |
| 10,013,777 B2 | 7/2018 | Mariampillai et al. |
| 10,015,908 B2 | 7/2018 | Williams et al. |
| 10,016,852 B2 | 7/2018 | Broda |
| 10,016,942 B2 | 7/2018 | Mark et al. |
| 10,017,384 B1 | 7/2018 | Greer et al. |
| 10,018,576 B2 | 7/2018 | Herbsommer et al. |
| 10,022,792 B2 | 7/2018 | Srivas et al. |
| 10,022,912 B2 | 7/2018 | Kia et al. |
| 10,027,376 B2 | 7/2018 | Sankaran et al. |
| 10,029,415 B2 | 7/2018 | Swanson et al. |
| 10,040,239 B2 | 8/2018 | Brown, Jr. |
| 10,046,412 B2 | 8/2018 | Blackmore |
| 10,048,769 B2 | 8/2018 | Selker et al. |
| 10,052,712 B2 | 8/2018 | Blackmore |
| 10,052,820 B2 | 8/2018 | Kemmer et al. |
| 10,055,536 B2 | 8/2018 | Maes et al. |
| 10,058,764 B2 | 8/2018 | Aders |
| 10,058,920 B2 | 8/2018 | Buller et al. |
| 10,061,906 B2 | 8/2018 | Nilsson |
| 10,065,270 B2 | 9/2018 | Buller et al. |
| 10,065,361 B2 | 9/2018 | Susnjara et al. |
| 10,065,367 B2 | 9/2018 | Brown, Jr. |
| 10,068,316 B1 | 9/2018 | Holzer et al. |
| 10,071,422 B2 | 9/2018 | Buller et al. |
| 10,071,525 B2 | 9/2018 | Susnjara et al. |
| 10,072,179 B2 | 9/2018 | Drijfhout |
| 10,074,128 B2 | 9/2018 | Colson et al. |
| 10,076,875 B2 | 9/2018 | Mark et al. |
| 10,076,876 B2 | 9/2018 | Mark et al. |
| 10,081,140 B2 | 9/2018 | Paesano et al. |
| 10,081,431 B2 | 9/2018 | Seack et al. |
| 10,086,568 B2 | 10/2018 | Snyder et al. |
| 10,087,320 B2 | 10/2018 | Simmons et al. |
| 10,087,556 B2 | 10/2018 | Gallucci et al. |
| 10,099,427 B2 | 10/2018 | Mark et al. |
| 10,100,542 B2 | 10/2018 | GangaRao et al. |
| 10,100,890 B2 | 10/2018 | Bracamonte et al. |
| 10,107,344 B2 | 10/2018 | Bracamonte et al. |
| 10,108,766 B2 | 10/2018 | Druckman et al. |
| 10,113,600 B2 | 10/2018 | Bracamonte et al. |
| 10,118,347 B2 | 11/2018 | Stauffer et al. |
| 10,118,579 B2 | 11/2018 | Lakic |
| 10,120,078 B2 | 11/2018 | Bruder et al. |
| 10,124,546 B2 | 11/2018 | Johnson et al. |
| 10,124,570 B2 | 11/2018 | Evans et al. |
| 10,137,500 B2 | 11/2018 | Blackmore |
| 10,138,354 B2 | 11/2018 | Groos et al. |
| 10,144,126 B2 | 12/2018 | Krohne et al. |
| 10,145,110 B2 | 12/2018 | Carney et al. |
| 10,151,363 B2 | 12/2018 | Bracamonte et al. |
| 10,152,661 B2 | 12/2018 | Kieser |
| 10,160,278 B2 | 12/2018 | Coombs et al. |
| 10,161,021 B2 | 12/2018 | Lin et al. |
| 10,166,752 B2 | 1/2019 | Evans et al. |
| 10,166,753 B2 | 1/2019 | Evans et al. |
| 10,171,578 B1 | 1/2019 | Cook et al. |
| 10,173,255 B2 | 1/2019 | TenHouten et al. |
| 10,173,327 B2 | 1/2019 | Kraft et al. |
| 10,178,800 B2 | 1/2019 | Mahalingam et al. |
| 10,179,640 B2 | 1/2019 | Wilkerson |
| 10,183,330 B2 | 1/2019 | Buller et al. |
| 10,183,478 B2 | 1/2019 | Evans et al. |
| 10,189,187 B2 | 1/2019 | Keating et al. |
| 10,189,240 B2 | 1/2019 | Evans et al. |
| 10,189,241 B2 | 1/2019 | Evans et al. |
| 10,189,242 B2 | 1/2019 | Evans et al. |
| 10,190,424 B2 | 1/2019 | Johnson et al. |
| 10,195,693 B2 | 2/2019 | Buller et al. |
| 10,196,539 B2 | 2/2019 | Boonen et al. |
| 10,197,338 B2 | 2/2019 | Melsheimer |
| 10,200,677 B2 | 2/2019 | Trevor et al. |
| 10,201,932 B2 | 2/2019 | Flitsch et al. |
| 10,201,941 B2 | 2/2019 | Evans et al. |
| 10,202,673 B2 | 2/2019 | Lin et al. |
| 10,204,216 B2 | 2/2019 | Nejati et al. |
| 10,207,454 B2 | 2/2019 | Buller et al. |
| 10,209,065 B2 | 2/2019 | Estevo, Jr. et al. |
| 10,210,662 B2 | 2/2019 | Holzer et al. |
| 10,213,837 B2 | 2/2019 | Kondoh |
| 10,214,248 B2 | 2/2019 | Hall et al. |
| 10,214,252 B2 | 2/2019 | Schellekens et al. |
| 10,214,275 B2 | 2/2019 | Goehlich |
| 10,220,575 B2 | 3/2019 | Reznar |
| 10,220,881 B2 | 3/2019 | Tyan et al. |
| 10,221,530 B2 | 3/2019 | Driskell et al. |
| 10,226,900 B1 | 3/2019 | Nevins |
| 10,232,550 B2 | 3/2019 | Evans et al. |
| 10,234,342 B2 | 3/2019 | Moorlag et al. |
| 10,237,477 B2 | 3/2019 | Trevor et al. |
| 10,252,335 B2 | 4/2019 | Buller et al. |
| 10,252,336 B2 | 4/2019 | Buller et al. |
| 10,254,499 B1 | 4/2019 | Cohen et al. |
| 10,257,499 B2 | 4/2019 | Hintz et al. |
| 10,259,044 B2 | 4/2019 | Buller et al. |
| 10,268,181 B1 | 4/2019 | Nevins |
| 10,269,225 B2 | 4/2019 | Velez |
| 10,272,860 B2 | 4/2019 | Mohapatra et al. |
| 10,272,862 B2 | 4/2019 | Whitehead |
| 10,275,564 B2 | 4/2019 | Ridgeway et al. |
| 10,279,580 B2 | 5/2019 | Evans et al. |
| 10,285,219 B2 | 5/2019 | Fetfatsidis et al. |
| 10,286,452 B2 | 5/2019 | Buller et al. |
| 10,286,603 B2 | 5/2019 | Buller et al. |
| 10,286,961 B2 | 5/2019 | Hillebrecht et al. |
| 10,289,263 B2 | 5/2019 | Troy et al. |
| 10,289,875 B2 | 5/2019 | Singh et al. |
| 10,291,193 B2 | 5/2019 | Dandu et al. |
| 10,294,552 B2 | 5/2019 | Liu et al. |

(56) References Cited

U.S. PATENT DOCUMENTS

| | | |
|---|---|---|
| 10,294,982 B2 | 5/2019 | Gabrys et al. |
| 10,295,989 B1 | 5/2019 | Nevins |
| 10,303,159 B2 | 5/2019 | Czinger et al. |
| 10,307,824 B2 | 6/2019 | Kondoh |
| 10,310,197 B1 | 6/2019 | Droz et al. |
| 10,313,651 B2 | 6/2019 | Trevor et al. |
| 10,315,252 B2 | 6/2019 | Mendelsberg et al. |
| 10,336,050 B2 | 7/2019 | Susnjara |
| 10,337,542 B2 | 7/2019 | Hesslewood et al. |
| 10,337,952 B2 | 7/2019 | Bosetti et al. |
| 10,339,266 B2 | 7/2019 | Urick et al. |
| 10,343,330 B2 | 7/2019 | Evans et al. |
| 10,343,331 B2 | 7/2019 | McCall et al. |
| 10,343,355 B2 | 7/2019 | Evans et al. |
| 10,343,724 B2 | 7/2019 | Polewarczyk et al. |
| 10,343,725 B2 | 7/2019 | Martin et al. |
| 10,350,823 B2 | 7/2019 | Rolland et al. |
| 10,356,341 B2 | 7/2019 | Holzer et al. |
| 10,356,395 B2 | 7/2019 | Holzer et al. |
| 10,357,829 B2 | 7/2019 | Spink et al. |
| 10,357,957 B2 | 7/2019 | Buller et al. |
| 10,359,756 B2 | 7/2019 | Newell et al. |
| 10,369,629 B2 | 8/2019 | Mendelsberg et al. |
| 10,382,739 B1 | 8/2019 | Rusu et al. |
| 10,384,393 B2 | 8/2019 | Xu et al. |
| 10,384,416 B2 | 8/2019 | Cheung et al. |
| 10,389,410 B2 | 8/2019 | Brooks et al. |
| 10,391,710 B2 | 8/2019 | Mondesir |
| 10,392,097 B2 | 8/2019 | Pham et al. |
| 10,392,131 B2 | 8/2019 | Deck et al. |
| 10,393,315 B2 | 8/2019 | Tyan |
| 10,400,080 B2 | 9/2019 | Ramakrishnan et al. |
| 10,401,832 B2 | 9/2019 | Snyder et al. |
| 10,403,009 B2 | 9/2019 | Mariampillai et al. |
| 10,406,750 B2 | 9/2019 | Barton et al. |
| 10,412,283 B2 | 9/2019 | Send et al. |
| 10,416,095 B2 | 9/2019 | Herbsommer et al. |
| 10,421,496 B2 | 9/2019 | Swayne et al. |
| 10,421,863 B2 | 9/2019 | Hasegawa et al. |
| 10,422,478 B2 | 9/2019 | Leachman et al. |
| 10,425,793 B2 | 9/2019 | Sankaran et al. |
| 10,427,364 B2 | 10/2019 | Alves |
| 10,429,006 B2 | 10/2019 | Tyan et al. |
| 10,434,573 B2 | 10/2019 | Buller et al. |
| 10,435,185 B2 | 10/2019 | Divine et al. |
| 10,435,773 B2 | 10/2019 | Liu et al. |
| 10,436,038 B2 | 10/2019 | Buhler et al. |
| 10,438,407 B2 | 10/2019 | Pavanaskar et al. |
| 10,440,351 B2 | 10/2019 | Holzer et al. |
| 10,442,002 B2 | 10/2019 | Benthien et al. |
| 10,442,003 B2 | 10/2019 | Symeonidis et al. |
| 10,449,696 B2 | 10/2019 | Elgar et al. |
| 10,449,737 B2 | 10/2019 | Johnson et al. |
| 10,461,810 B2 | 10/2019 | Cook et al. |
| 2006/0108783 A1 | 5/2006 | Ni et al. |
| 2014/0277669 A1 | 9/2014 | Nardi et al. |
| 2017/0057558 A1* | 3/2017 | Hillebrecht .......... B62D 29/008 |
| 2017/0113344 A1 | 4/2017 | Schönberg |
| 2017/0341309 A1 | 11/2017 | Piepenbrock et al. |

FOREIGN PATENT DOCUMENTS

| | | |
|---|---|---|
| WO | 1996038260 A1 | 12/1996 |
| WO | 2003024641 A1 | 3/2003 |
| WO | 2004108343 A1 | 12/2004 |
| WO | 2005093773 A1 | 10/2005 |
| WO | 2007003375 A1 | 1/2007 |
| WO | 2007110235 A1 | 10/2007 |
| WO | 2007110236 A1 | 10/2007 |
| WO | 2008019847 A1 | 2/2008 |
| WO | 2007128586 A3 | 6/2008 |
| WO | 2008068314 A2 | 6/2008 |
| WO | 2008086994 A1 | 7/2008 |
| WO | 2008087024 A1 | 7/2008 |
| WO | 2008107130 A1 | 9/2008 |
| WO | 2008138503 A1 | 11/2008 |
| WO | 2008145396 A1 | 12/2008 |
| WO | 2009083609 A2 | 7/2009 |
| WO | 2009098285 A1 | 8/2009 |
| WO | 2009112520 A1 | 9/2009 |
| WO | 2009135938 A1 | 11/2009 |
| WO | 2009140977 A1 | 11/2009 |
| WO | 2010125057 A2 | 11/2010 |
| WO | 2010125058 A1 | 11/2010 |
| WO | 2010142703 A2 | 12/2010 |
| WO | 2011032533 A1 | 3/2011 |
| WO | 2014016437 A1 | 1/2014 |
| WO | 2014187720 A1 | 11/2014 |
| WO | 2014195340 A1 | 12/2014 |
| WO | 2015193331 A1 | 12/2015 |
| WO | 2016116414 A1 | 7/2016 |
| WO | 2017036461 A1 | 3/2017 |
| WO | 2019030248 A1 | 2/2019 |
| WO | 2019042504 A1 | 3/2019 |
| WO | 2019048010 A1 | 3/2019 |
| WO | 2019048498 A1 | 3/2019 |
| WO | 2019048680 A1 | 3/2019 |
| WO | 2019048682 A1 | 3/2019 |

* cited by examiner

ASSEMBLING STRUCTURES COMPRISING 3D PRINTED COMPONENTS AND STANDARDIZED COMPONENTS UTILIZING ADHESIVE CIRCUITS

CROSS-REFERENCE TO RELATED APPLICATIONS

This application is a continuation of, and claims priority to, U.S. patent application Ser. No. 15/855,800, filed on Dec. 27, 2017 and titled "ASSEMBLING STRUCTURES COMPRISING 3D PRINTED COMPONENTS AND STANDARDIZED COMPONENTS UTILIZING ADHESIVE CIRCUITS", the disclosure of which is hereby incorporated by reference in its entirety as if fully set forth herein.

BACKGROUND

Field

The present disclosure relates generally to apparatus and techniques in manufacturing, and more specifically to adhesives used in conjunction with three-dimensional (3-D) printed components for use in producing vehicles, boats, aircraft and other mechanical structures.

Background

Three-dimensional (3-D) printing, which may also be referred to as additive manufacturing, is a process used to create 3-D objects. The 3-D objects may be formed using layers of material based on digital model data of the object. A 3-D printer may form the structure defined by the digital model data by printing the structure one layer at a time. 3-D printed objects may be almost any shape or geometry.

A 3-D printer may disseminate a powder layer (e.g., powdered metal) on an operating surface. The powder layer may be approximately 100 microns thick. The 3-D printer may then bond particular areas of the powder layer into a layer of the object, e.g., by using a laser to bond the powder of the powder layer together. The steps may be repeated to sequentially form each layer. Accordingly, the 3-D printed object may be built layer by layer to form the 3-D object.

3-D printed components may be used to produce sub-components for various devices or apparatus. The 3-D printed sub-components may need to be attached or connected to other sub-components, including other 3-D printed sub-components, extruded sub-components, or still other sub-components.

SUMMARY

Several aspects of assembling structures comprising 3D printed components and standardized components utilizing adhesive circuits is presented.

An aspect is an apparatus including a plurality of additively manufactured components each having an adhesive injection channel. The components are connected together such that adhesive injection channels are aligned to form an adhesive path that allows adhesive flow between the components.

Another aspect is a vehicle including a plurality of subassemblies, each of the subassemblies having a plurality of additively manufactured components each having an adhesive injection channel. The components for each of the subassemblies are connected together such that adhesive injection channels are aligned to form an adhesive path that allows adhesive flow between the components. Each of the subassemblies may be connected together such the adhesive path for each of the subassemblies are aligned to allow the adhesive to flow between the subassemblies.

Another aspect is an apparatus, including an additively manufactured component having an adhesive injection channel and an adhesive flow mechanism comprising at least one of an adhesive side end effector or a vacuum side end effector, the adhesive flow mechanism configured to provide adhesive to the adhesive injection channels.

It will be understood that other aspects of adhesives for 3-D printed components and methods of connecting 3-D printed components with adhesives will become readily apparent to those skilled in the art from the following detailed description, wherein it is shown and described only several embodiments by way of illustration. As will be realized by those skilled in the art, the adhesives for 3-D printed components and methods for connecting 3-D printed components with adhesives are capable of other and different embodiments, and its several details are capable of modification in various other respects, all without departing from the invention. Accordingly, the drawings and detailed description are to be regarded as illustrative in nature and not as restrictive.

BRIEF DESCRIPTION OF THE DRAWINGS

Various aspects of using adhesives with 3-D printed components will now be presented in the detailed description by way of example, and not by way of limitation, in the accompanying drawings, wherein.

DETAILED DESCRIPTION

Figure 1A:
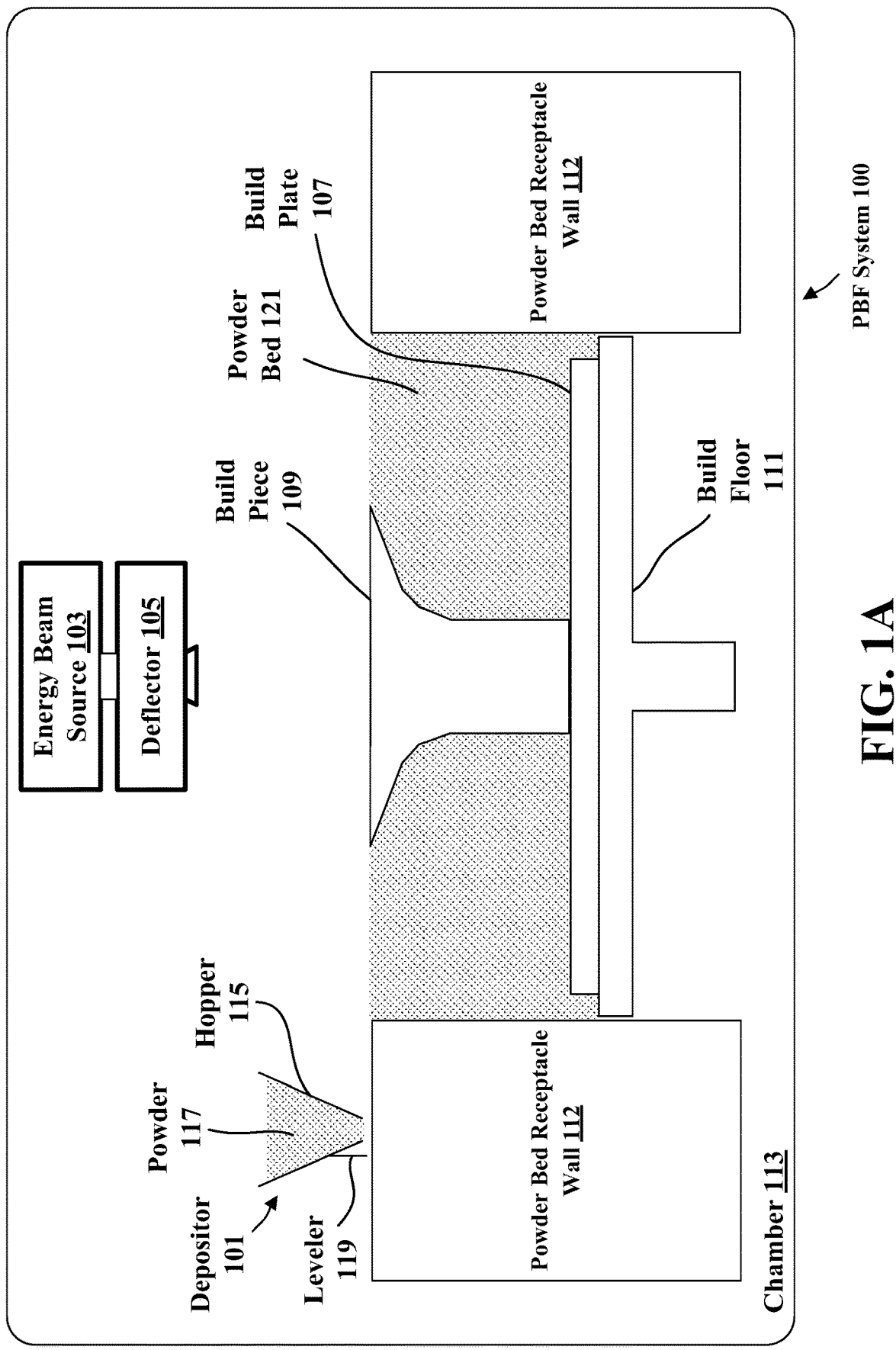
FIGS. 1A-D illustrate an example 3-D printer system during different stages of operation.

The detailed description set forth below in connection with the appended drawings is intended to provide a description of various exemplary embodiments of using adhesives with 3-D printed components and is not intended to represent the only embodiments in which the invention may be practiced. The term "exemplary" used throughout this disclosure means "serving as an example, instance, or illustration," and should not necessarily be construed as preferred or advantageous over other embodiments presented in this disclosure. The detailed description includes specific details for the purpose of providing a thorough and complete disclosure that fully conveys the scope of the invention to those skilled in the art. However, the invention may be practiced without these specific details. In some instances, well-known structures and components may be shown in block diagram form, or omitted entirely, in order to avoid obscuring the various concepts presented throughout this disclosure.

The use of 3-D printing and using adhesives for three-dimensional printed components may provide significant flexibility for enabling manufacturers of mechanical structures and mechanized assemblies to manufacture parts with complex geometries. For example, 3-D printing techniques provide manufacturers with the flexibility to design and build parts having intricate internal lattice structures and/or profiles that are not possible to manufacture via traditional manufacturing processes.

FIGS. 1A-D illustrate respective side views of an exemplary 3-D printer system. In this example, the 3-D printer system is a powder-bed fusion (PBF) system 100. FIGS. 1A-D show PBF system 100 during different stages of operation. The particular embodiment illustrated in FIGS. 1A-D is one of many suitable examples of a PBF system employing principles of this disclosure. It should also be noted that elements of FIGS. 1A-D and the other figures in this disclosure are not necessarily drawn to scale, but may be drawn larger or smaller for the purpose of better illustration of concepts described herein. PBF system 100 can include a depositor 101 that can deposit each layer of metal powder, an energy beam source 103 that can generate an energy beam, a deflector 105 that can apply the energy beam to fuse the powder material, and a build plate 107 that can support one or more build pieces, such as a build piece 109. PBF system 100 can also include a build floor 111 positioned within a powder bed receptacle. The walls of the powder bed receptacle 112 generally define the boundaries of the powder bed receptacle, which is sandwiched between the walls 112 from the side and abuts a portion of the build floor 111 below. Build floor 111 can progressively lower build plate 107 so that depositor 101 can deposit a next layer. The entire mechanism may reside in a chamber 113 that can enclose the other components, thereby protecting the equipment, enabling atmospheric and temperature regulation and mitigating contamination risks. Depositor 101 can include a hopper 115 that contains a powder 117, such as a metal powder, and a leveler 119 that can level the top of each layer of deposited powder.

Referring specifically to FIG. 1A, this figure shows PBF system 100 after a slice of build piece 109 has been fused, but before the next layer of powder has been deposited. In fact, FIG. 1A illustrates a time at which PBF system 100 has already deposited and fused slices in multiple layers, e.g., 150 layers, to form the current state of build piece 109, e.g., formed of 150 slices. The multiple layers already deposited have created a powder bed 121, which includes powder that was deposited but not fused.

Figure 1B:
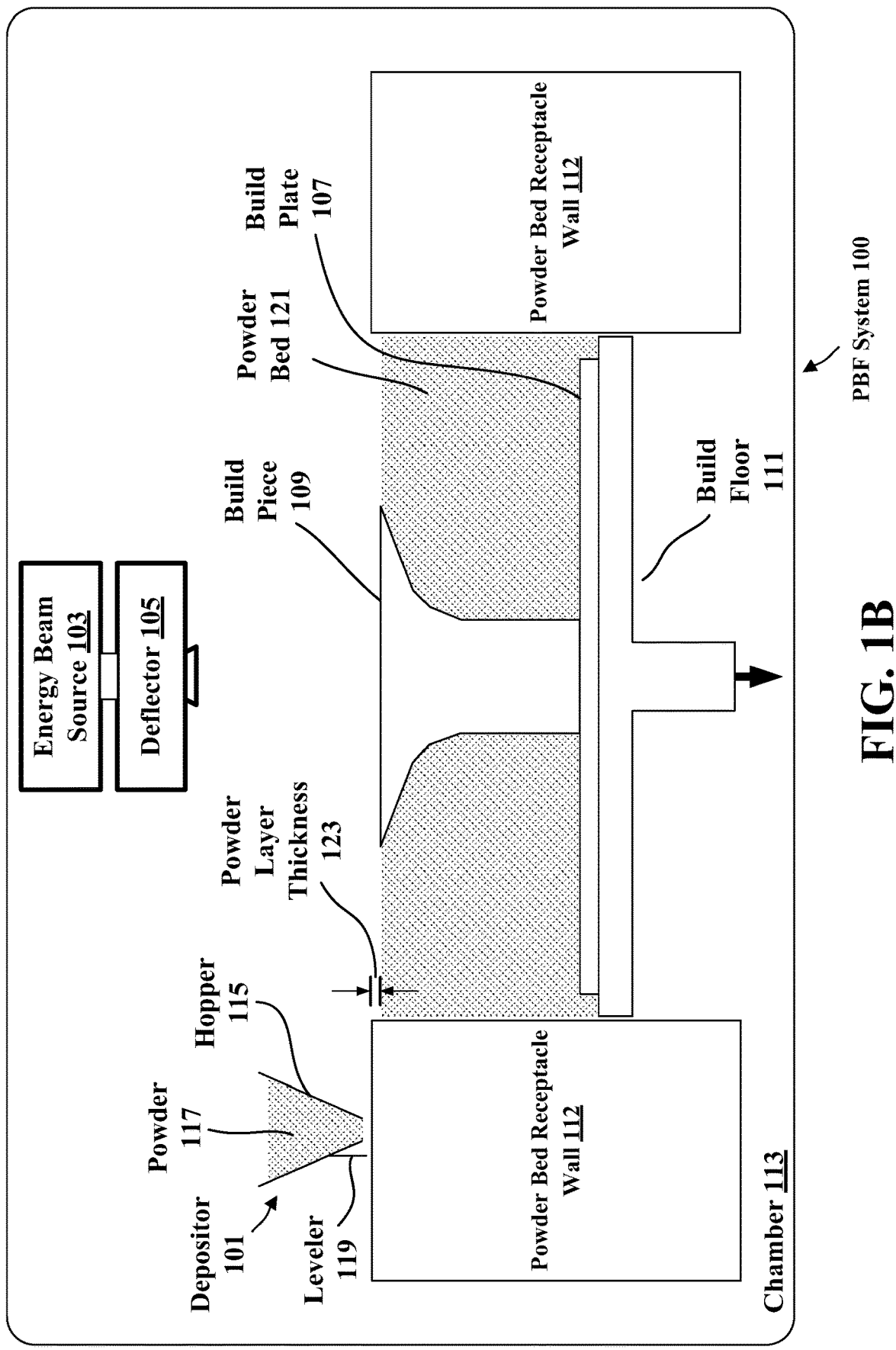

FIG. 1B shows PBF system 100 at a stage in which build floor 111 can lower by a powder layer thickness 123. The lowering of build floor 111 causes build piece 109 and powder bed 121 to drop by powder layer thickness 123, so that the top of the build piece and powder bed are lower than the top of powder bed receptacle wall 112 by an amount equal to the powder layer thickness. In this way, for example, a space with a consistent thickness equal to powder layer thickness 123 can be created over the tops of build piece 109 and powder bed 121.

Figure 1C:
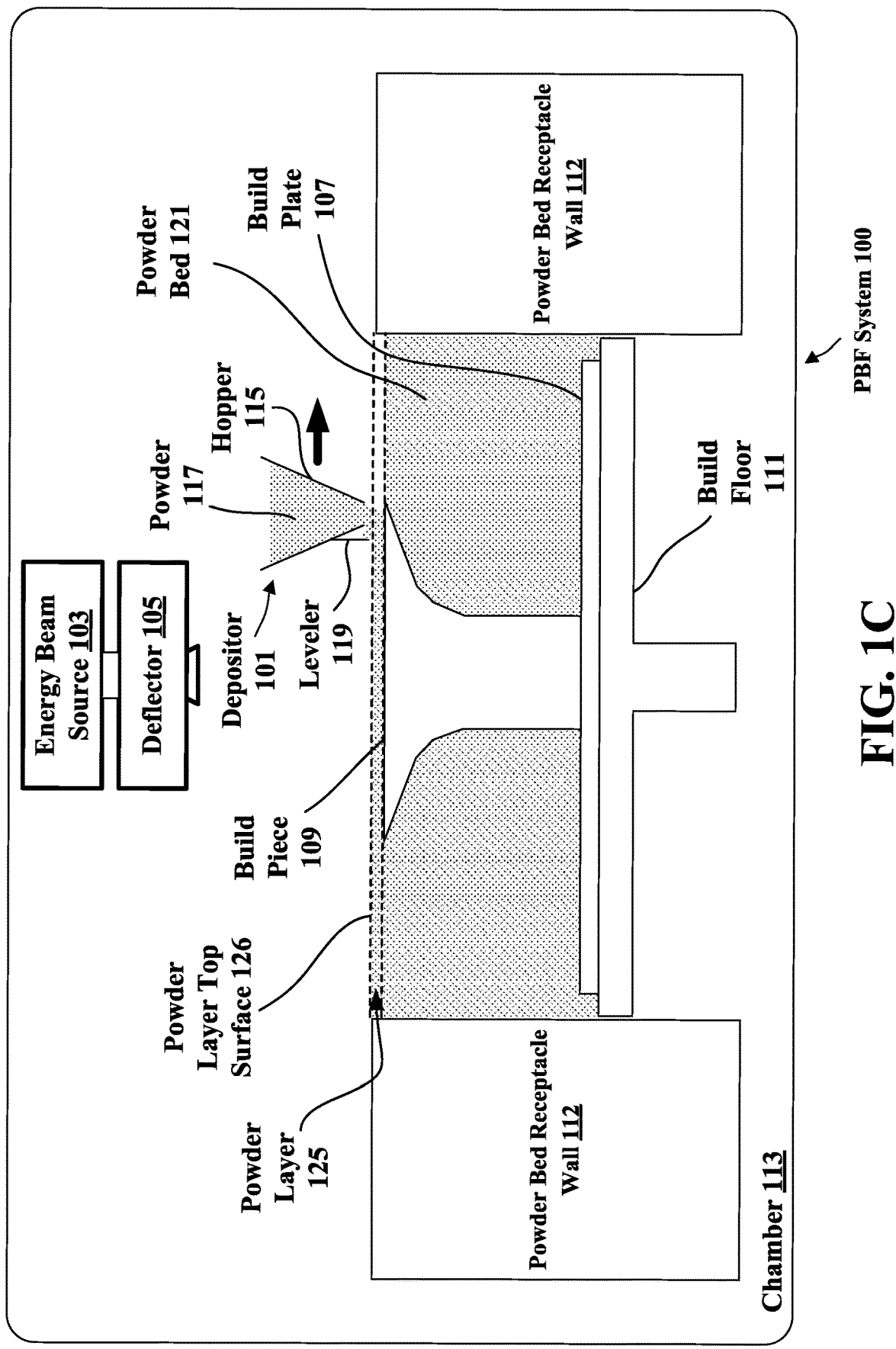

FIG. 1C shows PBF system 100 at a stage in which depositor 101 is positioned to deposit powder 117 in a space created over the top surfaces of build piece 109 and powder bed 121 and bounded by powder bed receptacle walls 112. In this example, depositor 101 progressively moves over the defined space while releasing powder 117 from hopper 115. Leveler 119 can level the released powder to form a powder layer 125 that has a thickness substantially equal to the powder layer thickness 123 (see FIG. 1B). Thus, the powder in a PBF system can be supported by a powder material support structure, which can include, for example, a build plate 107, a build floor 111, a build piece 109, walls 112, and the like. It should be noted that the illustrated thickness of powder layer 125 (i.e., powder layer thickness 123 (FIG. 1B)) is greater than an actual thickness used for the example involving 150 previously-deposited layers discussed above with reference to FIG. 1A.

Figure 1D:
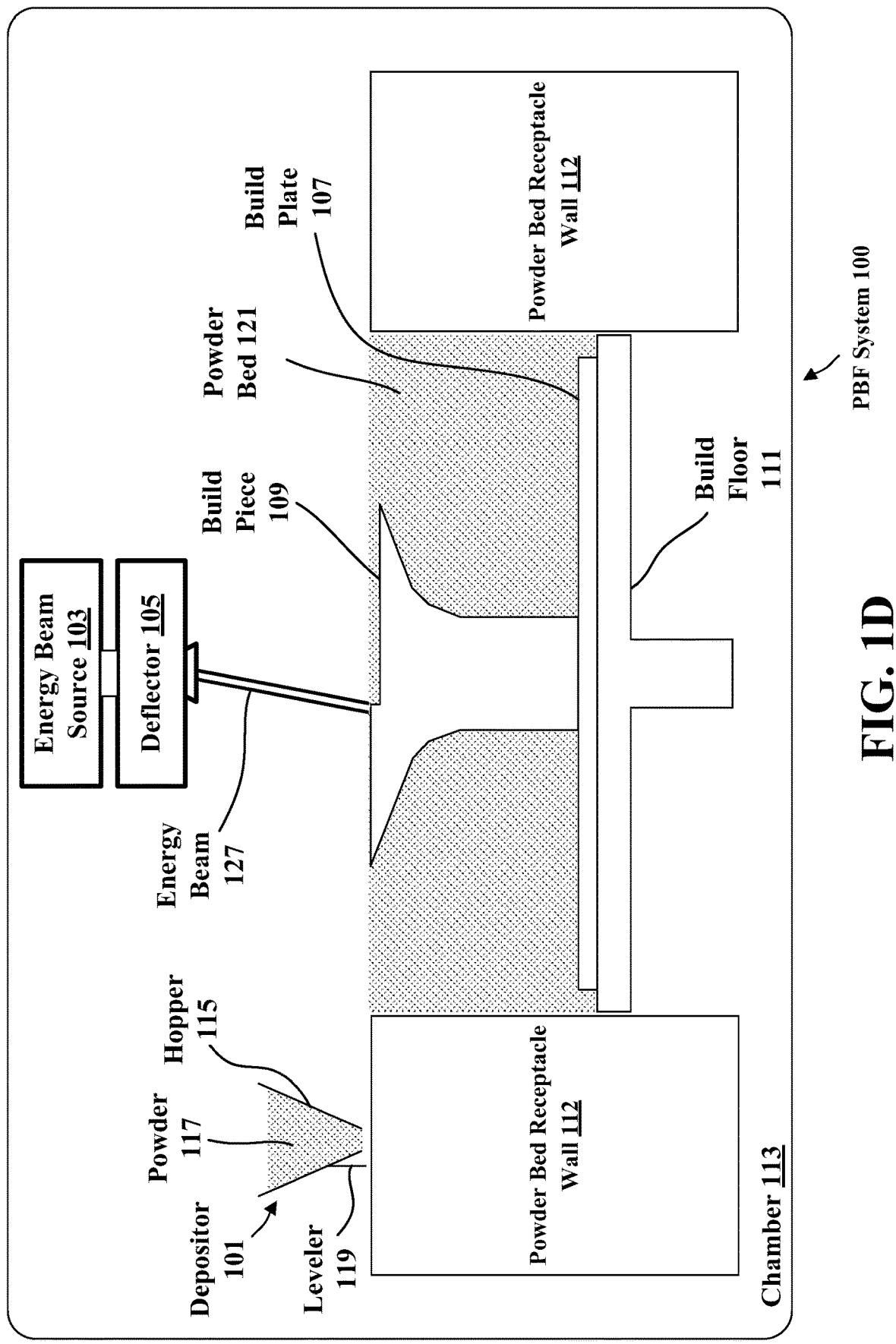

FIG. 1D shows PBF system 100 at a stage in which, following the deposition of powder layer 125 (FIG. 1C), energy beam source 103 generates an energy beam 127 and deflector 105 applies the energy beam to fuse the next slice in build piece 109. In various exemplary embodiments, energy beam source 103 can be an electron beam source, in which case energy beam 127 constitutes an electron beam. Deflector 105 can include deflection plates that can generate an electric field or a magnetic field that selectively deflects the electron beam to cause the electron beam to scan across areas designated to be fused. In various embodiments, energy beam source 103 can be a laser, in which case energy beam 127 is a laser beam. Deflector 105 can include an optical system that uses reflection and/or refraction to manipulate the laser beam to scan selected areas to be fused.

In various embodiments, the deflector 105 can include one or more gimbals and actuators that can rotate and/or translate the energy beam source to position the energy beam. In various embodiments, energy beam source 103 and/or deflector 105 can modulate the energy beam, e.g., turn the energy beam on and off as the deflector scans so that the energy beam is applied only in the appropriate areas of the powder layer. For example, in various embodiments, the energy beam can be modulated by a digital signal processor (DSP).

Figure 2:
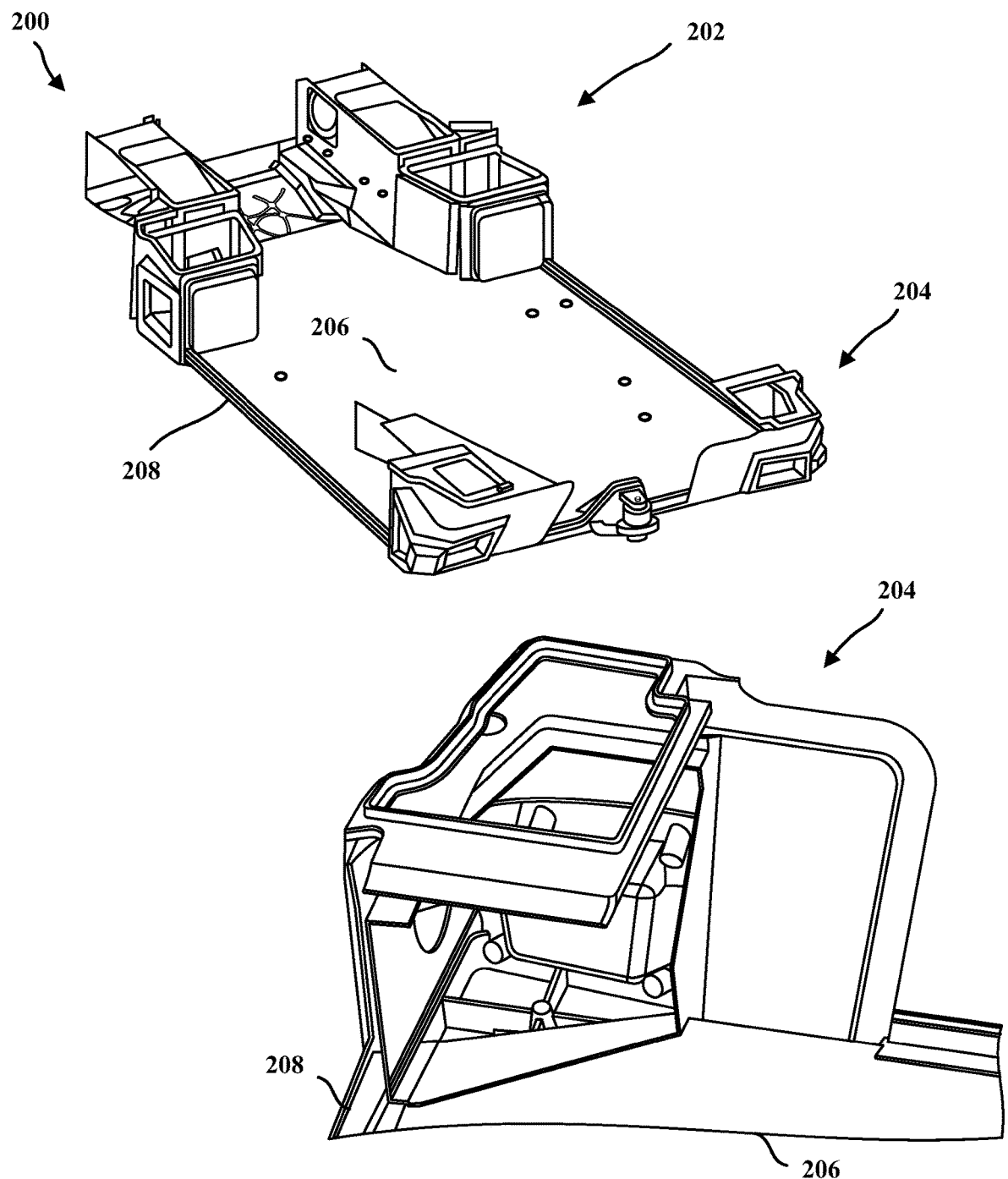
FIG. 2 is a diagram illustrating an assembly.

FIG. 2 is a diagram 200 illustrating an assembly 202. The assembly 202 (upper illustration) includes a printed node 204 (a closer view of which is provided in the lower illustration), a panel 206, and an extrusion 208. The panel 206 may be connected to the printed node 204 and the extrusion 208. For example, the panel 206 may be sandwiched between the printed node 204 and the extrusion 208.

In some aspects, the assembly 202 (or subassembly) may be fixtured using features on the node (e.g., printed node 204). The printed nodes 204 may be printed with a great degree of accuracy. The printed nodes 204 may be fixtured during the assembly process. The other components may float with respect to the printed node 204 during the assembly processes.

Figure 3:
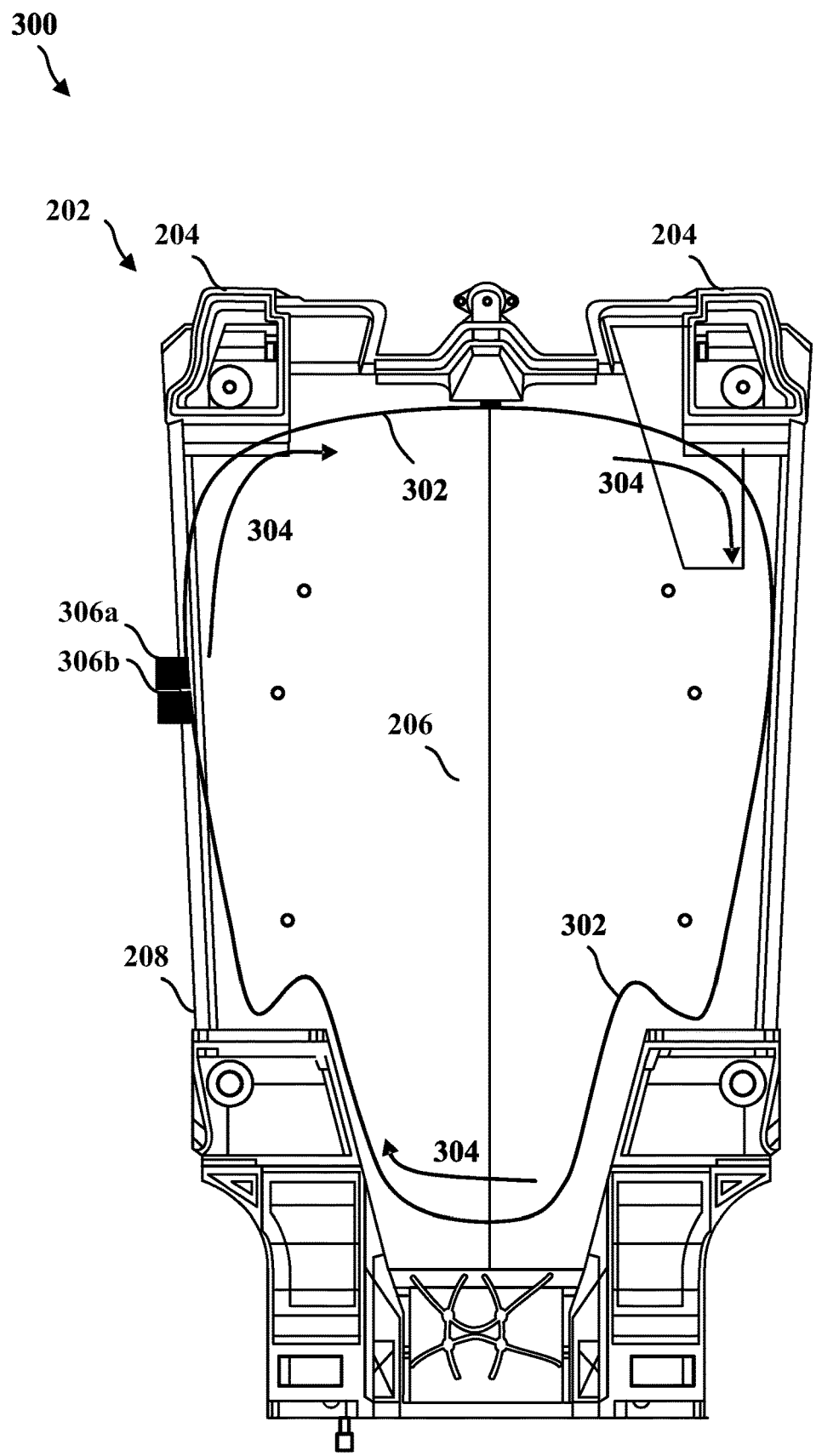
FIG. 3 is a diagram illustrating a joint circuit in the assembly of FIG. 3.

Some aspects described herein may use a section-by-section approach. In a section-by-section approach, each component (or section) may be connected together one-by-one. A section-by-section approach may be time-consuming. The assembly 202 of FIGS. 2-3 may use an adhesive flow circuit as illustrated in FIG. 3 (discussed below). In an adhesive flow circuit, different components may be placed together. Each component may include adhesive flow paths that may be connected together when the different sections are placed together. The adhesive may then be drawn into the adhesive flow paths between the various components to allow adhesive to flow into each of the various components. Accordingly, the adhesive may adhere the various components together, e.g., after the adhesive cures. In some examples, the components may form an apparatus or a vehicle, or another manufactured item.

FIG. 3 is a diagram 300 illustrating a joint circuit forming an adhesive flow circuit (adhesive path 304) in the assembly 202 of FIG. 2. In an aspect, an adhesive flow circuit (adhesive path 304) may be used across multiple components or sections in place of a section-by-section approach.

In an aspect, as illustrated in FIG. 3, an adhesive flow circuit (adhesive path 304) may be used. An adhesive flow circuit (adhesive path 304) may allow multiple components (or multiple sections of a component) (e.g., printed nodes 204, panel 206, extrusions 208) to be connected together at the same time. Additionally, an adhesive flow circuit (adhesive path 304) may reduce assembly costs, reduce assembly time, or both reduce assembly costs and reduce assembly time.

In an aspect, different sections may be placed together, e.g., in an assembly fixture (not shown). The different sections (e.g., printed nodes 204, panel 206, extrusions 208) may form a sub-assembly or an entire assembly. For example, the different sections may form a sub-assembly of a vehicle, an entire assembly of a vehicle, or other items that may be 3-D printed or assembled using the systems and methods described herein.

In an aspect, the sub-assembly or assembly may include one or more node-to-node connections, one or more node-to-panel connections, one or more node-to-extrusion connections, one or more extrusion-to-panel connections, or some combination of one or more node-to-node connections, node-to-panel connections, node-to-extrusion connections, extrusion-to-panel connections, or node-to-tube connections (e.g., using printed nodes 204, panel 206, extrusions 208, and/or other nodes, panel, extrusions).

In an aspect, sealants, adhesives, or both, may be applied to the different sections or components (e.g., printed nodes 204, panel 206, extrusions 208) that have been placed together, e.g., in an assembly fixture. Once the interfaces are sufficiently sealed, the entire assembly 202 may be connected to vacuum and adhesive tubes (not shown), e.g., to pull adhesive along the adhesive path 304. In an aspect, sealants may enable a vacuum to be drawn to evacuate the adhesive path. When the path is evacuated, adhesive may be injected. In addition to sealing the adhesive path so as to enable adhesive injection, the sealants may also prevent contact between dissimilar materials. Preventing contact between dissimilar materials may prevent galvanic corrosion. In an aspect, the sealant may be disposed along the adhesive path on both ends. The features for accepting seals may be additively manufactured with a node, or the features for accepting seals may be used on commercial-off-the-shelf parts as well. In an aspect, the sealants may include O-rings. In an aspect, the sealants may ensure that cured adhesive resides in a hermetically sealed environment on completion of an adhesive injection and curing process.

For example, adhesive may be drawn into interfaces (e.g., port 306a, 306b) by the vacuum in a loop (e.g., adhesive path 304 may form a loop), flowing into all the interfacing surfaces between the various connections between the components, (e.g., using printed nodes 204, panel 206, extrusions 208, and/or other nodes, panel, extrusions). Once the adhesive flows into all the interfacing surfaces, the entire assembly 202 may be left to cure. Weep holes may be provided to check for complete fill in the event high-temperature liquid adhesive is used without a vacuum mechanism. Additionally, some aspects of the printed node 204 may include protrusions. The printed node 204 and the protrusions may be 3-D printed. For example, the printed node 204 and any protrusions on the printed node 204 may be co-printed.

For example, an apparatus (e.g., assembly 202) may include a plurality of additively manufactured components (e.g., printed nodes 204) as well as other components in some aspects (e.g., panel 206, extrusions 208). Each additively manufactured component (e.g., printed nodes 204), as well as other components (e.g., panel 206, extrusions 208), may have an adhesive injection channel 302. The components (such as, in some aspects, additively manufactured components, e.g., printed nodes 204 as well as other components, e.g., panel 206, extrusions 208, and the like) may be connected together such that adhesive injection channels 302 are aligned to form an adhesive path 304 that may allow adhesive flow between the components (such as, in some aspects, additively manufactured components, e.g., printed nodes 204 as well as other components, e.g., panel 206, extrusions 208, and the like).

In an aspect, one of the components comprises adhesive ports 306a, 306b for injecting adhesive into the adhesive path 304. In an aspect, each of the components (e.g., printed nodes 204, panel 206, extrusions 208) may include a vacuum channel (similar in structure to adhesive injection channels 302) for drawing a vacuum and inducing the flow of the adhesive. The components (e.g., printed nodes 204, panel 206, extrusions 208) may be connected together such that vacuum channels (e.g., adhesive injection channels 302) may be aligned to form a vacuum path (e.g., adhesive path 304) that allows a vacuum between the components (additively manufactured components, e.g., printed nodes 204 as well as other components, e.g., panel 206, extrusions 208, in some aspects). In an aspect, by connecting the vacuum port (e.g., the adhesive port 306a or 306b) to a vacuum source, the adhesive path may be evacuated. The adhesive inlet port (e.g., the adhesive port 306b or 306a) and adhesive outlet port (e.g., the adhesive port 306a or 306b) (e.g., the vacuum port) are two ends of the adhesive path 304. In an aspect, one of the components may include a dedicated vacuum port for providing a vacuum to the vacuum path (e.g., adhesive path 304).

In an aspect, the components (additively manufactured components, e.g., printed nodes 204 as well as other components, e.g., panel 206, extrusions 208, in some aspects) may include a first subassembly, the apparatus further including a second subassembly and a member interconnecting the first and the second subassemblies. The member may include an adhesive injection channel 302 connecting the adhesive path through the components (additively manufactured components, e.g., printed nodes 204 as well as other components, e.g., panel 206, extrusions 208, in some aspects) to the second subassembly. An aspect may further include adhesive extending along the adhesive path 304.

In an aspect, one or more apertures in each of one or more components in communication with the adhesive path may provide a visual indication of adhesive flow. In an aspect, a first one of the components may include a node 204 connecting a second one of the components (206, 208) to a third one of the components (208, 206). In an aspect, the second one of the components comprises a panel 206. In an aspect, the second one of the components comprises a tube, such as, for example, an extruded tube integrated with extrusion 208. In an aspect, the components may form a subassembly for a vehicle. For example, the assembly 202 may be a subassembly of a vehicle. The components may be a subassembly for a vehicle chassis. In another aspect, the components may be a subassembly for a vehicle body.

Referring still to FIGS. 2-3, one aspect is an additively manufactured apparatus (e.g., assembly 202, including printed nodes 204, i.e., additively manufactured nodes, and other components that are not additively manufactured). The additively manufactured apparatus (e.g., assembly 202) may include a first additively manufactured component (e.g., node 204). The first additively manufactured component (e.g., node 204) may have an area configured to receive a second additively manufactured component (e.g., node 204), e.g., areas of connection between two nodes 204. The first component (e.g., node 204) may include an adhesive channel (e.g., adhesive injection channel 302) for injecting adhesive into the area when the second component (e.g., node 204) is being connected to the first component (e.g., node 204). In an aspect, the first component (e.g., node 204) may include a vacuum channel (e.g., adhesive injection channel 302, which may be connected to a vacuum, or alternatively, to a separate vacuum channel) for providing a vacuum to the area when the second component (e.g., node 204) is being connected to the first component (e.g., node 204). In an aspect, the first component may be the node 204. In an aspect, the area may be further configured to receive the second component, which may include a tube. For example, as described above the extrusion 208 may in some aspects include a tube. In another example, the extrusion 208 may be replaced by a 3-D printed tube, e.g., the same or similar size and shape to the extrusion illustrated in FIGS. 2-3, for example. It will be appreciated that the various components, extrusions, panels, nodes, assemblies illustrated herein are not intended to limit the sizes and shapes of components, extrusions, panels, nodes, assemblies that may be used in conjunction with the apparatus, vehicles, and methods described herein. In an aspect, the area configured to receive the second component may be a panel 206.

One aspect is a vehicle (e.g., assembly 202) including a plurality of subassemblies (e.g., printed nodes 204, panel 206, extrusions 208). In an aspect, each of the subassemblies (e.g., printed nodes 204) may have a plurality of additively manufactured components. Each of the additively manufactured components (e.g., printed nodes 204) may have an adhesive injection channel similar to adhesive injection channel 302. The components for each of the subassemblies (e.g., printed nodes 204, panel 206, extrusions 208) may be connected together such that adhesive injection channels (e.g., adhesive injection channel 302) are aligned to form an adhesive path 304 that allows substantially unimpeded adhesive flow between the components. Additionally, each of the subassemblies may be connected together such that the adhesive path for each of the subassemblies may be aligned to allow adhesive to flow between the subassemblies.

The example of FIGS. 2-3 illustrates subassemblies that may be joined together. Individual subassemblies may be fit and bonded together in a step-by-step manner to make larger and larger subassemblies. In an aspect, an adhesive may flow through the entire adhesive path 304 to bond the subassemblies together.

Some examples implementations of FIGS. 2-3 may use both a sealant and an adhesive. For example, a sealant may be applied to the components that make up the assembly 202 (or a sub-assembly). In an aspect not requiring seals, the assembly may be clamped together during adhesive injection and during curing. In an aspect, clamping may provide a fixturing mechanism, e.g., to hold components of an assembly until the adhesive sets or dries. Additionally, clamping may prevent contact between dissimilar materials. Accordingly, clamping may prevent galvanic corrosion by ensuring a clearance between the two (or more) components being assembled together, thereby preventing physical contact therebetween. The sealing and clamping steps may be repeated to create larger and larger assemblies, e.g., a car or a portion of a car. The sealant may allow for a vacuum to be generated by keeping the adhesive path from being exposed to the outside environment. In an aspect, contact between different materials in different components may cause galvanic corrosion to one or more of the materials in, e.g., one or more components.

A vacuum in the adhesive path 304 may be developed using a vacuum port or multiple vacuum ports. The number of vacuum ports may be based on one or more of the size of the assembly, the length of the adhesive path 304, the shape of the adhesive path 304, the timing desired for the addition of adhesive, or other factors of adding adhesive to the adhesive path 304 or factors of the design, such as availability of locations on the assembly for adhesive ports or vacuum ports.

In an aspect, larger assemblies may have a greater number of adhesive paths 304, longer adhesive paths 304, or both. Adding adhesive to a greater number of adhesive paths and/or longer adhesive paths may take longer. Accordingly, additional vacuum ports and/or more adhesive ports may be used for assemblies having long adhesive paths, a large number of adhesive paths or both, depending on the timing desired for the addition of adhesive. Conversely, assemblies having fewer adhesive paths and/or shorter adhesive paths may use fewer vacuum ports and/or adhesive ports.

In an aspect, the adhesive path 304 may be pulled to a vacuum (e.g., a near vacuum, or a decreased pressure relative to ambient pressure). Adhesive may then be added to the adhesive path 304. In an aspect, an adhesive path 304 may take as long to fill as the longest single path in the adhesive path 304, e.g., for equal volume rates for each adhesive port with each path having the same vacuum level.

Other aspects may use adhesive injection pressure, e.g., without a vacuum. In such an aspect, the pressure of the adhesive may expel air in the adhesive path 304 as the air is expelled from the adhesive path 304. The adhesive may be applied under pressure until adhesive flows out from weep holes, e.g., a hole or holes in an adhesive path that may generally be near the end of the adhesive path and configured to allow air to escape the adhesive path 304 as adhesive is added to the adhesive path 304 and allow adhesive to "weep" out of the hole when the adhesive path 304 is filled with adhesive. The weep holes may provide a visual indication that an adhesive path 304 has been filed with adhesive. Another aspect may use a foaming adhesive. The foaming adhesive may be activated by heating. The foaming adhesive may fill the adhesive path 304 and the adhesive path 304 may be heated to activate the foaming or the foaming adhesive to improve the bonding to the metal. Other aspects may use adhesive injection pressure and a vacuum.

An aspect may include features such as standoffs between sub-components. The standoffs may prevent contact between dissimilar materials of the sub-components. Accordingly, the standoffs may prevent galvanic corrosion. In an aspect, clamping may be used to connect sub-components to the standoff. Other aspects to prevent galvanic corrosion will be apparent to persons skilled in the art.

An aspect may be an apparatus that includes an additively manufactured component (e.g., printed nodes 204) having an adhesive injection channel (e.g., adhesive path 304) and an adhesive flow mechanism including at least one of an adhesive side end effector or a vacuum side end effector (e.g., the adhesive port 306a or 306b). The adhesive flow mechanism may be configured to provide adhesive to the adhesive injection channels (e.g., adhesive path 304).

Figure 4:
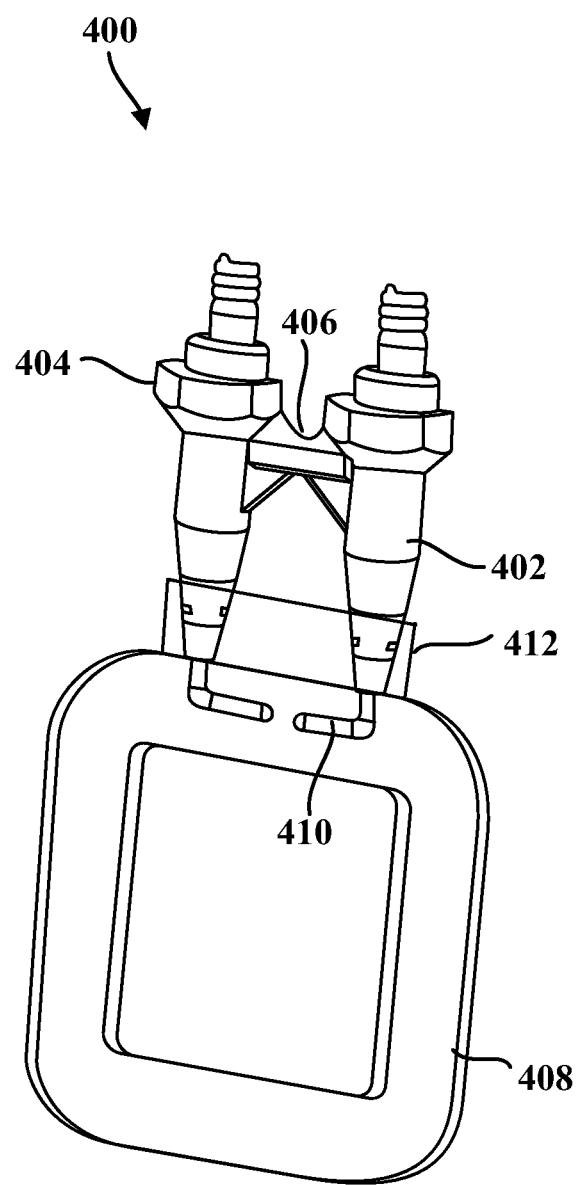
FIG. 4 is a diagram illustrating an adhesive flow mechanism.

FIG. 4 is a diagram illustrating an adhesive flow mechanism 400 coupled to a node 408. The adhesive flow mechanism 400 may be referred to as an end effector or a single effector for adhesive injection and vacuum 406. The adhesive flow mechanism 400 may include an adhesive side end effector 402 for injecting adhesive into an adhesive channel 410 of the node 408. The adhesive channels 410 may extend from both the ports to complete an adhesive path loop or circuit. The adhesive flow mechanism 400 may include a vacuum side end effector 404 for applying a vacuum to the adhesive channel 410 of the node 408. The adhesive flow mechanism 400 may include an effector feature 412 which may be coupled to the node 408 and may have a boss with recesses.

In an aspect, adhesive may be introduced to the subassembly or assembly (e.g., the node 408) using a sequential process. Acceptor features may be included with the additively manufactured nodes 408. The nodes 408 may be connected to other nodes (not shown), extrusions, tubes, castings, or other components that may be connected to a node. The node 408 may be adhesively bonded to the other component(s). The acceptor features may include a boss with two recesses, e.g., one for receiving a tip of the adhesive side of the end effector 402 and one for receiving a tip of the vacuum side of the end effector 404. The boss may serve as a reference for the end effector to enable automated assembly of transport structures comprising additively manufactured nodes 408 and the aforementioned components, e.g., other nodes, extrusions, tubes, castings, or other components that may be connected to a node.

In an aspect, the adhesive injection process may be broken down into three steps (1) drawing the vacuum, (2) injecting the adhesive, (3) sealing the adhesive and vacuum ports on the node.

Figure 5:
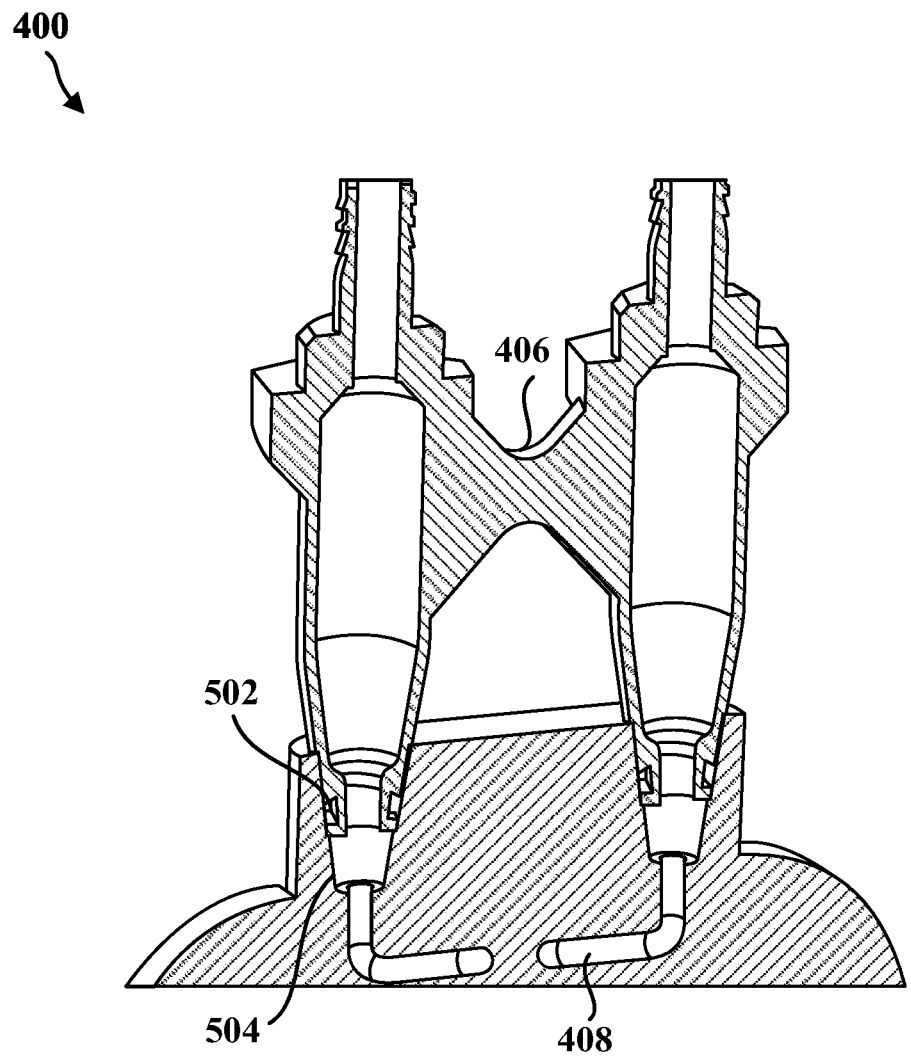
FIG. 5 is a diagram further illustrating the adhesive flow mechanism of FIG. 4.

FIG. 5 is a diagram further illustrating the adhesive flow mechanism 400 of FIG. 4. The adhesive flow mechanism 400 may be a single effector 406 for adhesive injection and vacuum. The adhesive flow mechanism 400 may include two leads 502, 504 that maybe used for drawing the vacuum (502) and injecting (504) the adhesive. The effector 406 may engage with the corresponding female features (e.g., a recess 506) on the boss 508 feature of the node 408. To cause the adhesive injection to happen in a hermetically sealed process, the leads of the effectors may comprise sealing grooves 510, which may be used to install O-Rings 512. The O-Rings 512 may press against the wall 514 of the recesses 506 and seal the interface between the recesses 506 and the effector leads 516. In an aspect, the ends of the leads would be made of rubber, and contact of the ends with the mating features on the boss 508 may be sufficient to ensure a seal. In an aspect, once the O-Rings 512 engage, a vacuum may be drawn first. Once a complete vacuum is realized between the node and the corresponding component(s), adhesive injection may commence. On realization of a complete adhesive fill, the effector 406 may be removed. In an aspect, the use of the effector 406 may be followed by a third effector lead, which may be similar the adhesive flow mechanism 400 (or one half of the adhesive flow mechanism 400) and may be used to apply a sealant on the recesses to ensure that adhesive spillage does not occur. In another aspect, the third effector lead to apply the sealant may be a part of one effector system, with the adhesive and vacuum leads. In an aspect, the sealant may cure rapidly, and well in advance of the adhesive curing.

Figure 6:
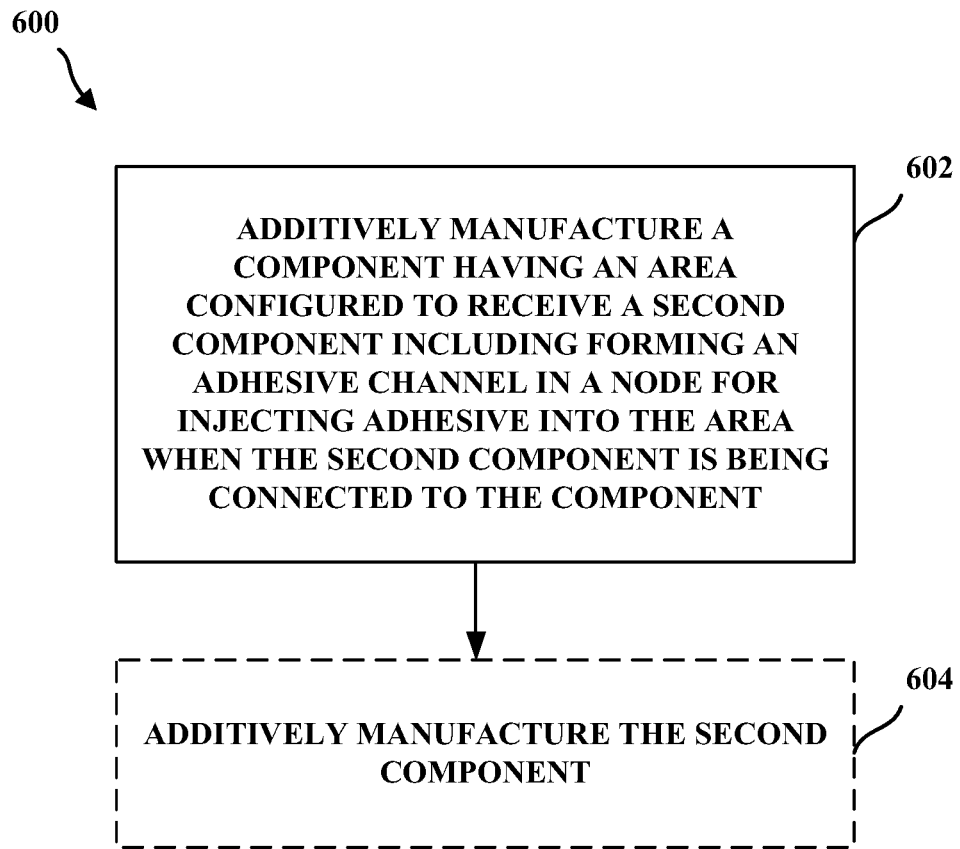
FIG. 6 is a flowchart illustrating an example method in accordance with the systems and methods described herein.

FIG. 6 is a flowchart 600 illustrating an example method in accordance with the systems and methods described herein. At block 602, a component (e.g., node 204) may be additively manufactured having an area configured to receive a second additively manufactured component (e.g., another node 204). The method may include forming an adhesive channel (e.g., adhesive injection channel 302) in a node 204 for injecting adhesive into the area between the components when the second component is being connected to the component. For example, a component (e.g., node 204) may be additively manufactured using a 3-D printer (100). The additively manufactured component (e.g., node 204) may have an area configured to receive a second additively manufactured component (e.g., node 204) including forming an adhesive channel (e.g., adhesive injection channel 302) in a node 204 for injecting adhesive into the relevant area when the second component is being connected to the component.

At block 604, additively manufacturing the second component. In an aspect, the second component may be additively manufactured. In another aspect, the second component may be a commercial off the shelf product.

In an aspect, additively manufacturing the component (e.g., node 204) may include forming a vacuum channel (e.g., adhesive injection channel 302) in the node 204 for providing a vacuum to the area between the components when the second component (e.g., another node 204) is being connected to the component (e.g., node 204). In an aspect, additively manufacturing the component may include forming the area in a shape suitable for receiving the second component. In another example, the second component may be a tube, e.g., a printed or extruded tube as described above. In an aspect, additively manufacturing the component may include forming an area in a shape suitable to receive the second component (e.g., node 204). In another example, the second component may be a panel 206.

Figure 7:
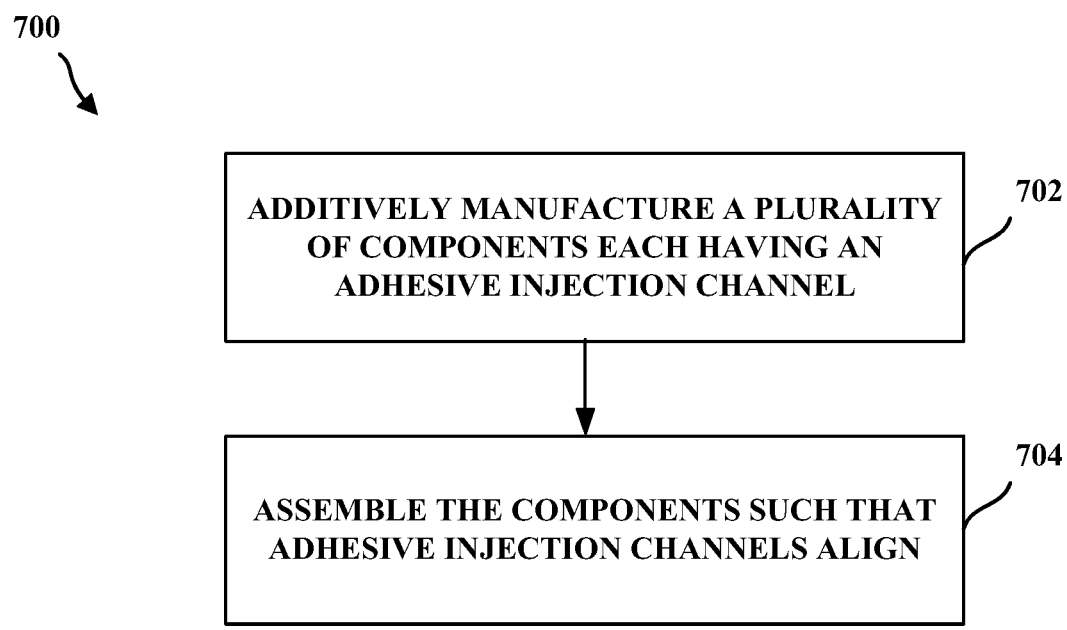
FIG. 7 is a flowchart illustrating an example method in accordance with the systems and methods described herein.

FIG. 7 is a flowchart 700 illustrating an example method in accordance with the systems and methods described herein. The method includes, in block 702, additively manufacturing a plurality of components each having an adhesive injection channel. For example, a plurality of components (e.g., printed nodes 204, panel 206, extrusions 208) may be additively manufactured, each having an adhesive injection channel (e.g., adhesive injection channel 302).

In block 704, the components may be assembled such that adhesive injection channels align to form an adhesive path that allows adhesive flow between the components. For example, the components may be assembled such that adhesive injection channels (e.g., adhesive injection channel 302) align to form an adhesive path 304 that allows adhesive flow between the components.

In an aspect, additively manufacturing the components (e.g., printed nodes 204) may include forming one of the components with an adhesive port 306*a*, 306*b* for injecting adhesive into the adhesive path 304. An aspect relates to injecting adhesive through the adhesive port 306*a*, 306*b* into the adhesive path 304 to adhere the components (e.g., printed nodes 204, panel 206, extrusions 208) together. In an aspect, the additively manufacturing of the component (e.g., printed nodes 204) includes forming a vacuum channel in each of the components, and assembling the components includes aligning the vacuum channels (e.g., adhesive injection channel 302) to form a vacuum path (e.g., adhesive path 304 or a dedicated vacuum path that may be connected or coupled to a vacuum) that allows a vacuum between the various components. The adhesive channels (e.g., adhesive injection channel 302) may extend from both the ports (e.g., adhesive port 306*a*, 306*b*) to complete an adhesive path loop or circuit.

In an aspect, additively manufacturing the components may include forming one of the components with a vacuum port (e.g., adhesive port 306*a*, 306*b*) for providing a vacuum to the vacuum path.

In an aspect, the components (e.g., printed nodes 204, panel 206, extrusions 208) may be assembled into a first subassembly. The method may further include assembling a second subassembly and a member having an adhesive injection channel 302. The method may include interconnecting the first and the second subassemblies via the member such that the adhesive injection channel 302 in the member connects the adhesive path 304 to the second subassembly. An aspect may include injecting adhesive through the adhesive path 304 and the adhesive injection channel 302 in the member into the second subassembly. In an aspect, additively manufacturing the components (e.g., printed nodes 204) may include forming one or more apertures in one or more of the components in communication with the adhesive path 304 to provide a visual indication of adhesive flow.

In an aspect, the assembling the components (e.g., printed nodes 204, panel 206, extrusions 208) may include using a first one of the components including a node 204 to connect a second one of the components (e.g., another node 204, panel 206, extrusions 208) to a third one of the components (e.g., panel 206, extrusions 208, and the like).

In an aspect, in place of additively manufacturing a second component, the second component may be a panel 206. In an aspect, the additively manufacturing of the components (e.g., printed nodes 204) may include forming the second one of the components into a tube (e.g., additively manufacturing a tube the size and shape of the extrusion 208).

In an aspect, any of the components as described above may be assembled into a subassembly for a vehicle. In an aspect, the components may be assembled into a subassembly for a vehicle chassis. Alternatively, the components (e.g., printed nodes 204, panel 206, extrusions 208) may be assembled into a subassembly for a vehicle body.

Figure 8:
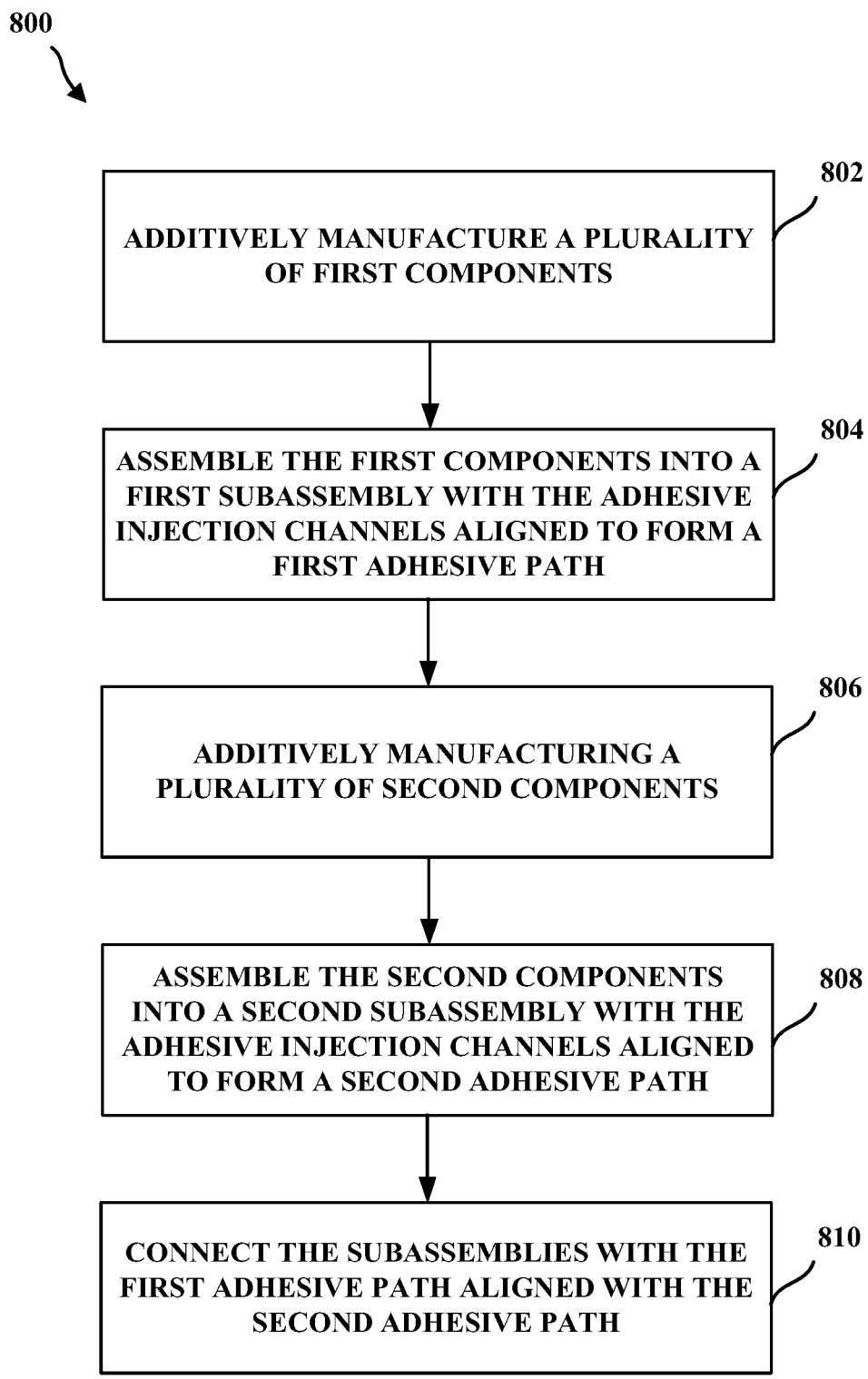
FIG. 8 is a flowchart illustrating an example method in accordance with the systems and methods described herein.

FIG. 8 is a flowchart 800 illustrating an example method in accordance with the systems and methods described herein. In block 802, a plurality of first components such as, for example, nodes, may be additively manufactured. Each of the first components may include an adhesive injection channel. Each of the first components may be manufactured to include an adhesive injection channel as described above.

In block 804, the first components may be assembled into a first subassembly with the adhesive injection channels aligned to form a first adhesive path that allows adhesive flow between the first components. For example, the first components, such as nodes 204, may be assembled into a first subassembly with the adhesive injection channels (302) aligned to form a first adhesive path (304) that allows adhesive flow between the first components (nodes 204).

In block 806, a plurality of second components may be additively manufactured, each of the second components having an adhesive injection channel. These second components may, for example, include nodes 204 such that each of the second components (nodes 204) has an adhesive injection channel (302).

In block 808, the second components may be assembled into a second subassembly with the adhesive injection channels aligned to form a second adhesive path that allows adhesive flow between the second components. For example, the second components may include nodes 204 and may be assembled into a second subassembly with the adhesive injection channels (302) aligned to form a second adhesive path (304) that allows adhesive flow between the second components, such as additional nodes 204.

In block 810, the subassemblies may be connected with the first adhesive path (304) aligned with the second adhesive path (304) to allow adhesive to flow between the first and second subassemblies. For example, the subassemblies may be connected with the first adhesive path (304) aligned with the second adhesive path (304) to allow adhesive to flow between the first and second subassemblies.

The previous description is provided to enable any person skilled in the art to practice the various aspects described herein. Various modifications to these exemplary embodiments presented throughout this disclosure will be readily apparent to those skilled in the art, and the concepts disclosed herein may be applied to using adhesives with 3-D printed components. Thus, the claims are not intended to be limited to the exemplary embodiments presented throughout the disclosure but are to be accorded the full scope consistent with the language claims. All structural and functional equivalents to the elements of the exemplary embodiments described throughout this disclosure that are known or later come to be known to those of ordinary skill in the art are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112(f), or analogous law in applicable jurisdictions, unless the element is expressly recited using the phrase "means for" or, in the case of a method claim, the element is recited using the phrase "step for."

What is claimed is:

1. An apparatus, comprising:
a plurality of additively manufactured components, each additively manufactured component in the plurality of additively manufactured components including a fluid channel, wherein the fluid channel includes an enclosed passage within each additively manufactured component in the plurality of additively manufactured components, wherein the additively manufactured components are configured to be connected together such that the fluid channels form a fluid path that allows the fluid to flow between the additively manufactured components within the fluid path, wherein a first additively manufactured component in the plurality of additively manufactured components includes two discontinuous sections of the fluid channel, wherein the fluid path is configured to connect the two discontinuous sections through the fluid channel of at least a second additively manufactured component, and wherein at least one of the additively manufactured components in the plurality of additively manufactured components comprises a fluid flow orifice configured to provide fluid to the fluid channels, wherein the fluid flow orifice comprises at least one of a fluid side end effector or a vacuum side end effector.

2. The apparatus of claim 1, wherein the flow of the fluid within the fluid path is assisted via a vacuum.

3. The apparatus of claim 2, wherein at least one of the additively manufactured components in the plurality of additively manufactured components comprises a vacuum port for providing the vacuum to the fluid path.

4. The apparatus of claim 1, further comprising the fluid extending along the fluid path.

5. The apparatus of claim 1, further comprising one or more apertures in each additively manufactured component in the plurality of additively manufactured components in communication with the fluid path to provide a visual indication of the flow of the fluid.

6. The apparatus of claim 1, wherein a first one of the additively manufactured components comprises a component connecting a second one of the additively manufactured components to a third one of the additively manufactured components.

7. The apparatus of claim 6, wherein the second one of the additively manufactured components comprises a panel.

8. The apparatus of claim 6, wherein the second one of the additively manufactured components comprises a tube.

9. The apparatus of claim 1, wherein the additively manufactured components comprise a subassembly for a vehicle.

10. The apparatus of claim 1, wherein the additively manufactured components comprise a subassembly for a vehicle chassis.

11. The apparatus of claim 1, wherein the additively manufactured components comprise a subassembly for a vehicle body.

12. The apparatus of claim 1, further comprising a standoff between at least two of the plurality of additively manufactured components.

13. The apparatus of claim 1, wherein the apparatus further comprises a member having a fluid channel interconnecting the plurality of additively manufactured components via the fluid path.

14. An apparatus, comprising:
- a plurality of additively manufactured components, each additively manufactured component in the plurality of additively manufactured components including a fluid channel, wherein the fluid channel includes an enclosed passage within each additively manufactured component in the plurality of additively manufactured components, wherein the additively manufactured components are configured to be connected together such that the fluid channels form a fluid path that allows the fluid to flow between the additively manufactured components within the fluid path; and
- a fluid flow orifice configured to provide fluid to the fluid channels, wherein the fluid flow orifice comprises at least one of a fluid side end effector or a vacuum side end effector.

15. The apparatus of claim 14, wherein the flow of the fluid within the fluid path is assisted via a vacuum.

16. The apparatus of claim 15, wherein at least one of the additively manufactured components in the plurality of additively manufactured components comprises a vacuum port for providing the vacuum to the fluid path.

17. The apparatus of claim 14, further comprising the fluid extending along the fluid path.

18. The apparatus of claim 14, further comprising one or more apertures in each additively manufactured component in the plurality of additively manufactured components in communication with the fluid path to provide a visual indication of the flow of the fluid.

19. The apparatus of claim 14, wherein a first one of the additively manufactured components comprises a component connecting a second one of the additively manufactured components to a third one of the additively manufactured components.

20. The apparatus of claim 19, wherein the second one of the additively manufactured components comprises a panel.

21. The apparatus of claim 19, wherein the second one of the additively manufactured components comprises a tube.

22. The apparatus of claim 14, wherein the additively manufactured components comprise a subassembly for a vehicle.

23. The apparatus of claim 14, wherein the additively manufactured components comprise a subassembly for a vehicle chassis.

24. The apparatus of claim 14, wherein the additively manufactured components comprise a subassembly for a vehicle body.

25. The apparatus of claim 14, further comprising a standoff between at least two of the plurality of additively manufactured components.

26. The apparatus of claim 14, wherein the apparatus further comprises a member having a fluid channel interconnecting the plurality of additively manufactured components via the fluid path.

* * * * *